US012743980B2

(12) United States Patent
Wu et al.

(10) Patent No.: US 12,743,980 B2
(45) Date of Patent: Sep. 22, 2026

(54) DISPLAY DEVICE AND DRIVING METHOD

(71) Applicant: BOE TECHNOLOGY GROUP CO., LTD., Beijing (CN)

(72) Inventors: Baoyun Wu, Beijing (CN); Kaimin Wang, Beijing (CN); Xinbin Han, Beijing (CN); Hui Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/025,775

(22) PCT Filed: May 27, 2022

(86) PCT No.: PCT/CN2022/095551
§ 371 (c)(1),
(2) Date: Mar. 10, 2023

(87) PCT Pub. No.: WO2023/225992
PCT Pub. Date: Nov. 30, 2023

(65) Prior Publication Data
US 2024/0290237 A1 Aug. 29, 2024

(51) Int. Cl.
*G09G 3/20* (2006.01)

(52) U.S. Cl.
CPC ... *G09G 3/2003* (2013.01); *G09G 2300/0443* (2013.01); *G09G 2300/0452* (2013.01); *G09G 2320/0666* (2013.01); *G09G 2330/021* (2013.01)

(58) Field of Classification Search
CPC ......... G09G 3/2003; G09G 2300/0443; G09G 2300/0452; G09G 2320/0666; G09G 2330/021
See application file for complete search history.

(56) References Cited

U.S. PATENT DOCUMENTS 5,495,287 A * 2/1996 Kasai .................. G09G 3/3648 345/95
2006/0038757 A1 2/2006 Lee et al.
2009/0102853 A1 4/2009 Kawasaki et al.
(Continued)

FOREIGN PATENT DOCUMENTS

CN 1737892 A 2/2006
CN 102903334 A 1/2013
(Continued)

OTHER PUBLICATIONS

Office Action dated Apr. 30, 2026, issued in counterpart CN Application No. 202280001496.7, with English translation. (21 pages).

*Primary Examiner* — Christopher E Leiby
(74) *Attorney, Agent, or Firm* — WHDA, LLP

(57) ABSTRACT

The present disclosure provides a display device and a driving method thereof. The display device includes: a plurality of sub-pixels and a plurality of data lines, each data line being coupled to a plurality of sub-pixels in a same color; a control module configured to output a plurality of groups of first data signals; and a driving module configured to rearrange the plurality of groups of first data signals to obtain a plurality of groups of second data signals. The driving module is further configured to transmit each group of second data signals to the plurality of data lines.

20 Claims, 4 Drawing Sheets

(56) References Cited

U.S. PATENT DOCUMENTS

| | | | |
|---|---|---|---|
| 2011/0043500 A1 | 2/2011 | Kwak et al. | |
| 2017/0098119 A1* | 4/2017 | Gope | G06T 7/246 |
| 2017/0358268 A1 | 12/2017 | Nishio et al. | |
| 2018/0130450 A1 | 5/2018 | Yang et al. | |
| 2018/0174511 A1 | 6/2018 | Kim et al. | |
| 2019/0096360 A1 | 3/2019 | Xi et al. | |
| 2020/0251038 A1 | 8/2020 | Chien et al. | |
| 2022/0189394 A1* | 6/2022 | Yang | G09G 3/2003 |

FOREIGN PATENT DOCUMENTS

| | | | |
|---|---|---|---|
| CN | 104483794 | A | 4/2015 |
| CN | 106448527 | A | 2/2017 |
| CN | 107656717 | A | 2/2018 |
| CN | 108062931 | A | 5/2018 |
| CN | 108230994 | A | 6/2018 |
| CN | 111508446 | A | 8/2020 |
| CN | 111862830 | A | 10/2020 |
| CN | 113903315 | A | 1/2022 |
| WO | 2018/176569 | A1 | 10/2018 |

* cited by examiner

DISPLAY DEVICE AND DRIVING METHOD

CROSS-REFERENCE TO RELATED APPLICATION

This application is the U.S. national phase of PCT Application No. PCT/CN2022/095551 filed on May 27, 2022, the entire contents of which are hereby incorporated by reference.

TECHNICAL FIELD

The present disclosure relates to the field of display technology, in particular to a display device and a driving method thereof.

BACKGROUND

With the continuous development of display technology, high-resolution display panels have been widely used in various fields. In the high-resolution display panel, sub-pixels are rearranged so that the sub-pixels in different colors in two rows are arranged in a staggered manner. In this regard, for a same data line, if a first data voltage corresponding to a sub-pixel in a first color is outputted in an $n^{th}$ row, a second data voltage corresponding to a sub-pixel in a second color needs to be outputted in an $(n+1)^{th}$ row, resulting in a voltage swing on the data line.

SUMMARY

An object of the present disclosure is to provide a display device and a driving method thereof, so as to solve the above-mentioned problem.

The present disclosure provides the following technical solutions.

In one aspect, the present disclosure provides in some embodiments a display device, including: a plurality of sub-pixels and a plurality of data lines, each data line being coupled to a plurality of sub-pixels in a same color: a control module configured to output a plurality of groups of first data signals, each group of first data signals corresponding to the sub-pixels in a same color; and a driving module configured to rearrange the plurality of groups of first data signals to obtain a plurality of groups of second data signals, each group of second data signals corresponding to the sub-pixels in at least one row, and at least two sub-pixels in the at least one row being in different colors. The driving module is further configured to transmit each group of second data signals to the plurality of data lines.

In a possible embodiment of the present disclosure, the control module includes: a graphic processing sub-module configured to generate a to-be-displayed image: a data separation sub-module configured to obtain the plurality of groups of first data signals corresponding to the sub-pixels in different colors in accordance with the to-be-displayed image: and a data compression sub-module configured to compress and output the plurality of groups of first data signals.

In a possible embodiment of the present disclosure, the driving module includes: a data decompression sub-module configured to decompress the plurality of groups of first data signals after compression: and a data rearrangement sub-module configured to rearrange the plurality of groups of first data signals to obtain the plurality of groups of second data signals.

In a possible embodiment of the present disclosure, the driving module further includes a data processing sub-module configured to process the plurality of groups of second data signals through a sub-pixel rendering algorithm and transmit each group of second data signals processed through the sub-pixel rendering algorithm to the plurality of data lines.

In a possible embodiment of the present disclosure, the plurality of sub-pixels includes sub-pixels arranged in a plurality of first columns and sub-pixels arranged in a plurality of second columns, the sub-pixels in the first columns and the sub-pixels in the second columns are alternately arranged in a first direction, the sub-pixels in the first column include first sub-pixels and second sub-pixels arranged alternately in a second direction, the sub-pixels in the second column include a plurality of third sub-pixels arranged in the second direction, and the first sub-pixel, the second sub-pixel and the third sub-pixel are in different colors. The sub-pixels in the plurality of first columns include a plurality of sub-pixel groups, each sub-pixel group includes sub-pixels in two adjacent first columns, the plurality of data lines includes a plurality of first data lines, and each first data line is coupled to the first sub-pixels in a corresponding sub-pixel group.

In a possible embodiment of the present disclosure, the plurality of sub-pixels includes sub-pixels arranged in a plurality of rows, and in an arrangement direction of the sub-pixels in the plurality of rows, the first data line is coupled to the first sub-pixels in each row in the corresponding sub-pixel group.

In a possible embodiment of the present disclosure, the first data line includes a plurality of first connection portions and a second connection portion, the plurality of first connection portions is arranged in the arrangement direction of the sub-pixels in the plurality of rows, the first connection portions are coupled to the first sub-pixels in two adjacent rows in the corresponding sub-pixel group respectively, and the second connection portion is coupled to the first sub-pixel in a last row in the corresponding sub-pixel group.

In a possible embodiment of the present disclosure, the plurality of data lines further includes a plurality of second data lines, and each second data line is coupled to the second sub-pixels in a corresponding sub-pixel group.

In a possible embodiment of the present disclosure, the second data line is coupled to the second sub-pixels in each row in the corresponding sub-pixel group.

In a possible embodiment of the present disclosure, the second data line includes a plurality of third connection portions and a fourth connection portion, the plurality of third connection portions is arranged in the arrangement direction of the sub-pixels in the plurality of rows, the third connection portions are coupled to the second sub-pixels in two adjacent rows in the corresponding sub-pixel group respectively, and the fourth connection portion is coupled to the second sub-pixel in a last row in the corresponding sub-pixel group.

In a possible embodiment of the present disclosure, the plurality of sub-pixels includes sub-pixels arranged in a plurality of first columns and sub-pixels arranged in a plurality of second columns, the sub-pixels in the first columns and the sub-pixels in the second columns are alternately arranged in a first direction, the sub-pixels in the first columns include first sub-pixels and second sub-pixels arranged alternately in a second direction, the sub-pixels in the second columns include a plurality of third sub-pixels arranged in the second direction, and the first sub-pixel, the second sub-pixel and the third sub-pixel are in different colors. The plurality of data lines includes a plurality of fourth data lines and a plurality of fifth data lines, each fourth data line is coupled to the first sub-pixels in the sub-pixels in a corresponding first column, and each fifth data line is coupled to the second sub-pixels in the sub-pixels in a corresponding first column.

In a possible embodiment of the present disclosure, the plurality of data lines further includes a plurality of third data lines, and each third data line is coupled to the third sub-pixels in the sub-pixels in a corresponding second column.

In a possible embodiment of the present disclosure, the plurality of sub-pixels includes sub-pixels arranged in a plurality of third columns, the sub-pixels in the third column include first sub-pixels, second sub-pixels and third sub-pixels arranged alternately, and the first sub-pixel, the second sub-pixel and the third sub-pixel are in different colors. The sub-pixels in the plurality of third columns include a plurality of sub-pixel groups, each sub-pixel group includes sub-pixels in two adjacent third columns, the plurality of data lines includes a plurality of sixth data lines, a plurality of seventh data lines and a plurality of eighth data lines, each sixth data line is coupled to the first sub-pixels in a corresponding sub-pixel group, each seventh data line is coupled to the second sub-pixels in the corresponding sub-pixel group, and each eighth data line is coupled to the third sub-pixels in the corresponding sub-pixel group.

In a possible embodiment of the present disclosure, the plurality of sub-pixels includes sub-pixels arranged in a plurality of rows. In an arrangement direction of the sub-pixels in the plurality of rows, the sixth data line is coupled to the first sub-pixels in each row in a corresponding sub-pixel group, the seventh data line is coupled to the second sub-pixels in each row in a corresponding sub-pixel group, and the eighth data line is coupled to the third sub-pixels in each row in a corresponding sub-pixel group.

In another aspect, the present disclosure provides in some embodiments a method for driving the above-mentioned display device, including: outputting a plurality of groups of first data signals, each group of first data signals corresponding to sub-pixels in a same color: rearranging the plurality of groups of first data signals to obtain a plurality of groups of second data signals, each group of second data signals corresponding to sub-pixels in at least one row, and at least two sub-pixels in the sub-pixels in the at least one row being in different colors; and transmitting each group of second data signals to the plurality of data lines.

In a possible embodiment of the present disclosure, the outputting the plurality of groups of first data signals includes: generating a to-be-displayed image: obtaining the plurality of groups of first data signals corresponding to sub-pixels in different colors in accordance with the to-be-displayed image: and compressing and outputting the plurality of groups of first data signals.

In a possible embodiment of the present disclosure, the rearranging the plurality of groups of first data signals to obtain the plurality of groups of second data signals includes: decompressing the plurality of groups of first data signals after compression; and rearranging the plurality of groups of first data signals to obtain the plurality of groups of second data signals.

In a possible embodiment of the present disclosure, the method further includes processing the plurality of groups of second data signals through a sub-pixel rendering algorithm and transmitting each group of second data signals processed through the sub-pixel rendering algorithm to the plurality of data lines.

In yet another aspect, the present disclosure provides in some embodiments a display device, including a memory, a processor, and a computer program stored in the memory and executed by the processor. The computer program is executed by the processor so as to implement the above-mentioned method.

In still yet another aspect, the present disclosure provides in some embodiments a computer-readable storage medium storing therein a computer program. The computer program is executed by a processor so as to implement the above-mentioned method.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, due to the limitation of pixel arrangement, for a same data line, if a first data voltage corresponding to a sub-pixel in a first color is outputted in an $n^{th}$ row, a second data voltage corresponding to a sub-pixel in a second color needs to be outputted in an $(n+1)^{th}$ row, resulting in a voltage swing on the data line and thereby an increase in the power consumption of a display product. Moreover, when a data signal is transmitted from a central processing unit (CPU) to a driving chip, large power consumption also occurs for the display product.

Figure 1:
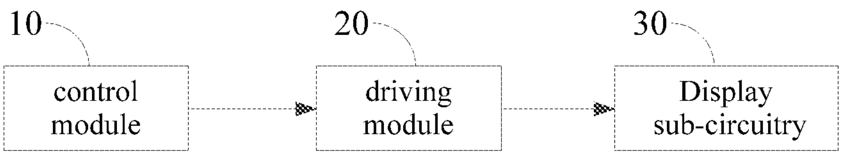
FIG. 1 is a schematic view showing a display device according to one embodiment of the present disclosure.

As shown in FIG. 1, the present disclosure provides in some embodiments a display device, which includes: a plurality of sub-pixels and a plurality of data lines, each data line being coupled to a plurality of sub-pixels in a same color: a control module 10 configured to output a plurality of groups of first data signals, each group of first data signals corresponding to the sub-pixels in a same color: and a driving module 20 configured to rearrange the plurality of groups of first data signals to obtain a plurality of groups of second data signals, each group of second data signals corresponding to the sub-pixels in at least one row, and at least two sub-pixels in the sub-pixels in at least one row being in different colors. The driving module is further configured to transmit each group of second data signals to the plurality of data lines.

For example, the display device includes a display sub-circuitry 30, the display sub-circuitry 30 includes a display region and a peripheral region surrounding the display region, and the plurality of sub-pixels is located in the display region. The data line includes a portion located in the display region and a portion located in the peripheral region, the portion of the data line in the display region is coupled to the plurality of sub-pixels in a same color, and the portion of the data line in the peripheral region is coupled to the driving module 20.

Figure 3:
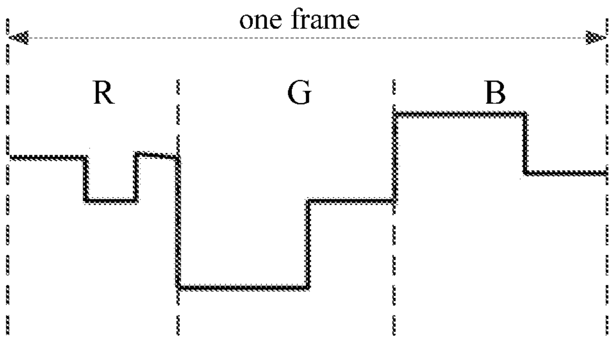
FIG. 3 is a schematic view showing three groups of first data signals corresponding to an image according to one embodiment of the present disclosure.

For example, the control module 10 outputs three groups of first data signals, a first group of first data signals corresponds to red sub-pixels, a second group of first data signals corresponds to green sub-pixels, and a third group of first data signals corresponds to blue sub-pixels. For example, the control module 10 transmits a plurality of groups of first data signals to the driving module 20 separately. As shown in FIG. 3, for example, in one display image, the three groups of first data signals correspond to red (R), green (G) and blue (B) sub-pixels respectively.

For example, the plurality of sub-pixels is arranged in an array form and includes sub-pixels arranged in a plurality of rows, and at least two sub-pixels in the sub-pixels in each row are in different colors.

For example, the driving module 20 is configured to rearrange the plurality of groups of first data signals to obtain a plurality of groups of second data signals, and each group of second data signals corresponds to sub-pixels in one row. When the sub-pixels in each row are scanned, the driving module 20 writes a group of second data signals corresponding to the sub-pixels in each row into the sub-pixels through the plurality of data lines, so as to achieve a display function of the display device.

For example, the control module 10 includes, but not limited to, an application processor (AP) (also called as a CPU) of a mobile phone.

For example, the driving module 20 includes, but not limited to, a driving chip.

According to the display device in the embodiments of the present disclosure, each data line is coupled to the plurality of sub-pixels in a same color, the control module 10 is configured to output the plurality of groups of first data signals, and each group of first data signals corresponds to the sub-pixels in a same color. The driving module is configured to rearrange the plurality of groups of first data signals to obtain a plurality of groups of second data signals, and each group of second data signals corresponds to the sub-pixels arranged in one row.

Each group of first data signals corresponds to the sub-pixels in a same color, so the data signals in each group of first data signals are similar to each other, and a swing frequency and a swing amplitude of the data signal in each group of first data signals are greatly reduced. In this way, it is able to remarkably reduce the power consumption of the control module 10 when the control module 10 outputs each group of first data signals to the driving module 20, thereby to achieve a better power-saving effect.

The driving module 20 rearranges the plurality of groups of first data signals to obtain the plurality of groups of second data signals corresponding to the sub-pixels in each row. During the display, when the sub-pixels in each row are scanned, the driving module 20 writes the group of second data signals corresponding to the sub-pixels in each row into the sub-pixels in a corresponding row through the plurality of data lines, so as to achieve a normal display function of the display device.

Each data line is coupled to the plurality of sub-pixels in a same color, so it is able to remarkably reduce a change in a frequency and an amplitude of the second data signal transmitted through each data line, thereby to reduce the power consumption of the display device.

Figure 2:
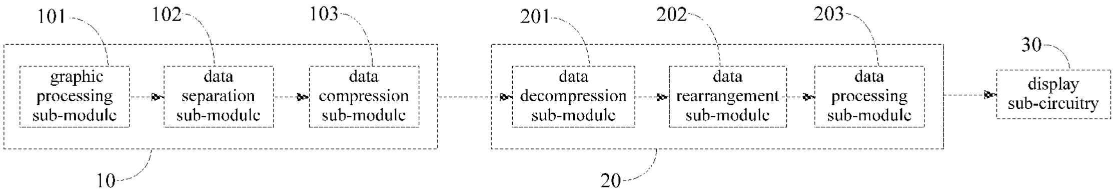
FIG. 2 is a schematic view showing sub-modules in a control module and a driving module of the display device according to one embodiment of the present disclosure.

As shown in FIG. 2, in some embodiments of the present disclosure, the control module 10 includes: a graphic processing sub-module 101 configured to generate a to-be-displayed image: a data separation sub-module 102 configured to obtain the plurality of groups of first data signals corresponding to the sub-pixels in different colors in accordance with the to-be-displayed image: and a data compression sub-module 103 configured to compress and output the plurality of groups of first data signals.

For example, the graphic processing sub-module 101 includes a graphics processing unit (GPU), and it is configured to generate the to-be-displayed image displayed by the display device.

For example, the data separation sub-module 102 obtains a first group of first data signals corresponding to red sub-pixels, a second group of first data signals corresponding to green sub-pixels and a third group of first data signals corresponding to blue sub-pixels in accordance with the to-be-displayed image.

For example, the data compression sub-module 103 compresses the plurality of groups of first data signals and outputs it to the driving module 20.

According to the display device in the embodiments of the present disclosure, the data separation sub-module 102 classifies the data signals corresponding to the to-be-displayed image, obtains the plurality of groups of first data signals corresponding to the sub-pixels in different colors, and transmits the plurality of groups of first data signals separately. Each group of first data signals corresponds to the sub-pixels in a same color, so the data signals in each group of first data signals are similar to each other, and a swing frequency and a swing amplitude of the data signal in each group of first data signals are greatly reduced. In this way, it is able to remarkably reduce the power consumption when each group of first data signals is outputted to the driving module 20, thereby to achieve a better power-saving effect.

In addition, each group of first data signals corresponds to the sub-pixels in a same color, so the data signals in each group of first data signals are similar to each other. In this way, it is able to facilitate the compression of the plurality of groups of first data signals through the data compression sub-module 103.

As shown in FIG. 2, in some embodiments of the present disclosure, the driving module 20 includes: a data decompression sub-module 201 configured to decompress the plurality of groups of first data signals after compression: and a data rearrangement sub-module 202 configured to rearrange the plurality of groups of first data signals to obtain the plurality of groups of second data signals.

For example, the data decompression sub-module 201 decompresses the plurality of groups of first data signals after compression and transmits the decompressed first data signals to the data rearrangement sub-module 202, and the data rearrangement sub-module 202 rearranges the plurality of groups of first data signals to obtain the plurality of groups of second data signals corresponding to the sub-pixels in each row.

As shown in FIG. 2, in some embodiments of the present disclosure, the driving module 20 further includes a data processing sub-module 203 configured to process the plurality of groups of second data signals through a sub-pixel rendering algorithm and transmit each group of second data signals processed through the sub-pixel rendering algorithm to the plurality of data lines.

For example, the control module 10 outputs three groups of first data signals, i.e., a group of first data signals corresponding to red sub-pixels, a group of first data signal corresponding to green sub-pixels, and a group of the first data signals corresponding to blue sub-pixels. The data rearrangement sub-module 202 rearranges the plurality of groups of first data signals to obtain the plurality of groups of second data signals. Each group of second data signals includes RGBRGBRGB . . . , where R represents a second data signal corresponding to the red sub-pixel, G represents a second data signal corresponding to the green sub-pixel, and B represents a second data signal corresponding the blue sub-pixel. The data processing sub-module 203 is configured to process the plurality of groups of second data signals through a sub-pixel rendering algorithm so as to obtain the plurality of groups of second data signals corresponding to the sub-pixels in each row in an RGBG arrangement mode in FIG. 4.

According to the display device in the embodiments of the present disclosure, the driving module 20 includes the data decompression sub-module 201, the data rearrangement sub-module 202 and the data processing sub-module 203, so as to transmit the plurality of first data signals to the plurality of data lines after compression, rearrangement and data processing. An object of the sub-pixel rendering algorithm is to enable the plurality of groups of second data signals to correspond to an actual arrangement mode of the sub-pixels in the display device, so as to write the data signals into the sub-pixels in each row in a better manner.

Figure 4:
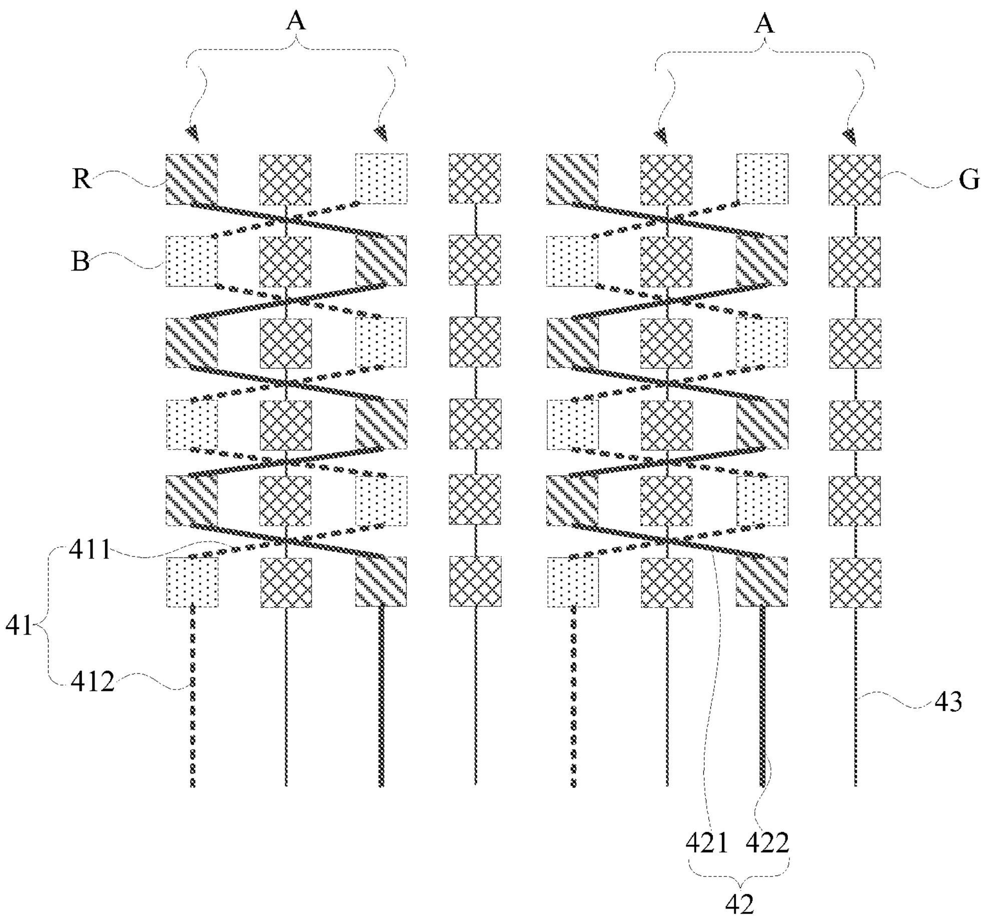
FIG. 4 is a schematic view showing the arrangement of data lines in a display sub-circuitry according to one embodiment of the present disclosure.

As shown in FIG. 4, in some embodiments of the present disclosure, the plurality of sub-pixels includes sub-pixels arranged in a plurality of first columns and sub-pixels arranged in a plurality of second columns. The sub-pixels in the first columns and the sub-pixels in the second columns are alternately arranged in a first direction, the sub-pixels in the first columns include first sub-pixels and second sub-pixels arranged alternately in a second direction, the sub-pixels in the second columns include a plurality of third sub-pixels arranged in the second direction, and the first sub-pixel, the second sub-pixel and the third sub-pixel are in different colors. The sub-pixels in the plurality of first columns include a plurality of sub-pixel groups, each sub-pixel group includes sub-pixels in two adjacent first columns, the plurality of data lines includes a plurality of first data lines 41, and each first data line 41 is coupled to the first sub-pixels in a corresponding sub-pixel group.

For example, the first direction is a horizontal direction, and the second direction is a longitudinal direction.

For example, the first sub-pixels include red sub-pixels, the second sub-pixels include blue sub-pixels, and the third sub-pixels include green sub-pixels.

For example, the sub-pixels in the plurality of first columns include a plurality of sub-pixel groups, each sub-pixel group includes sub-pixels in two adjacent first columns, and the sub-pixels in each first column belong to one sub-pixel group.

As shown in FIG. 4, for example, in a same sub-pixel group A, the first sub-pixels of the sub-pixels in one column are located in odd-numbered rows, and the second sub-pixels are located in even-numbered rows: and the first sub-pixels of the sub-pixels in the other column are located in even-numbered rows, and the second sub-pixels are located in odd-numbered rows.

According to the display device in the embodiments of the present disclosure, each first data line 41 is coupled to the first sub-pixels in a corresponding sub-pixel group, so that the sub-pixels coupled to the first data line 41 are the first sub-pixels in a same color. When the first data line 41 transmits the data signals to the sub-pixels and there is a small change in an image displayed by the display device, the data signal transmitted through the first data line 41 is maintained as a constant voltage for a long time period, so as to reduce a change frequency of the data signal transmitted through the first data line 41. When an image displayed by the display device is refreshed, voltage values of the desired data signals for the first sub-pixels are similar to each other, so a swing amplitude of the data signal transmitted through the first data line 41 is small, and there is a small change frequency of the data signal. In this regard, it is able to reduce the power consumption. In addition, the above arrangement mode of the first data lines 41 and the second data lines 42 is adapted to the conventional RGBG arrangement mode, without any need to change the arrangement mode of pixels.

As shown in FIG. 4, in some embodiments of the present disclosure, the plurality of sub-pixels includes sub-pixels arranged in a plurality of rows, and in an arrangement direction of the sub-pixels in the plurality of rows, the first data line is coupled to the first sub-pixels in each row in a corresponding sub-pixel group.

For example, the plurality of sub-pixels includes sub-pixels arranged in a plurality of rows in a second direction, and the sub-pixels in each row include sub-pixels arranged in a first direction. For example, the sub-pixels in each row include, but not limited to, first sub-pixels, third sub-pixels and second sub-pixels arranged alternately in sequence in the first direction.

As shown in FIG. 4, in some embodiments of the present disclosure, the first data line 41 includes a plurality of first connection portions 411 and a second connection portion 412, the plurality of first connection portions 411 is arranged in the arrangement direction of the sub-pixels in each row, the first connection portions 411 are coupled to the first sub-pixels in two adjacent rows of the corresponding sub-pixel group respectively, and the second connection portion 412 is coupled to the first sub-pixel in the corresponding sub-pixel group closest to a lower bezel or upper bezel.

For example, the first connection portion 411 includes at least a portion extending in a third direction, and the third direction intersects both the first direction and the second direction.

For example, the plurality of first connection portions 411 is coupled to each other in an end-to-end manner, and the second connection portion 412 is coupled to the driving module 20.

As shown in FIG. 4, in some embodiments of the present disclosure, the plurality of data lines further includes a plurality of second data lines 42, and each second data line 42 is coupled to the second sub-pixels in a corresponding sub-pixel group.

According to the display device in the embodiments of the present disclosure, each second data line 42 is coupled to the first sub-pixels in a corresponding sub-pixel group, so that the sub-pixels coupled to the second data line 42 are the first sub-pixels in a same color. When the second data line 42 transmits the data signals to the sub-pixels and there is a small change in an image displayed by the display device, the data signal transmitted through the second data line 42 is maintained as a constant voltage for a long time period, so as to reduce a change frequency of the data signal transmitted through the second data line 42. When an image displayed by the display device is refreshed, voltage values of the desired data signals for the second sub-pixels are similar to each other, so a swing amplitude of the data signal transmitted through the second data line 42 is small, and there is a small change frequency of the data signal. In this regard, it is able to reduce the power consumption.

As shown in FIG. 4, in some embodiments of the present disclosure, the plurality of sub-pixels includes sub-pixels arranged in a plurality of rows, and in the arrangement direction of the sub-pixels in each row, the second data line 42 is coupled to the second sub-pixels in each row in the corresponding sub-pixel group.

As shown in FIG. 4, in some embodiments of the present disclosure, the second data line 42 includes a plurality of third connection portions 421 and a fourth connection portion 422, the plurality of third connection portions 421 is arranged in the arrangement direction of the sub-pixels in each row, the third connection portions 421 are coupled to the second sub-pixels arranged in two adjacent rows of the corresponding sub-pixel group respectively, and the fourth connection portion 422 is coupled to the second sub-pixel in a first row in the corresponding sub-pixel group closest to a lower bezel or upper bezel.

For example, the third connection portion 421 includes at least a portion extending in the third direction.

For example, the plurality of third connection portions 421 is coupled to each other in an end-to-end manner, and the fourth connection portion 422 is coupled to the driving module 20.

For example, an orthogonal projection of the third connection portion 421 onto a base substrate of the display device partially overlaps with an orthogonal projection of the first connection portion 411 onto the base substrate. For example, the first connection portion 411 is arranged at a layer different from the third connection portion 421.

According to the display device in the embodiments of the present disclosure, when the first data lines 41 and the second data lines 42 are arranged as mentioned hereinabove, it is able to reduce the power consumption of the display device without any additional data lines.

For example, a length of the first data line 41 is the same as a length of the second data line 42, so as to reduce the occurrence of a signal delay for the sub-pixels.

Figure 5:
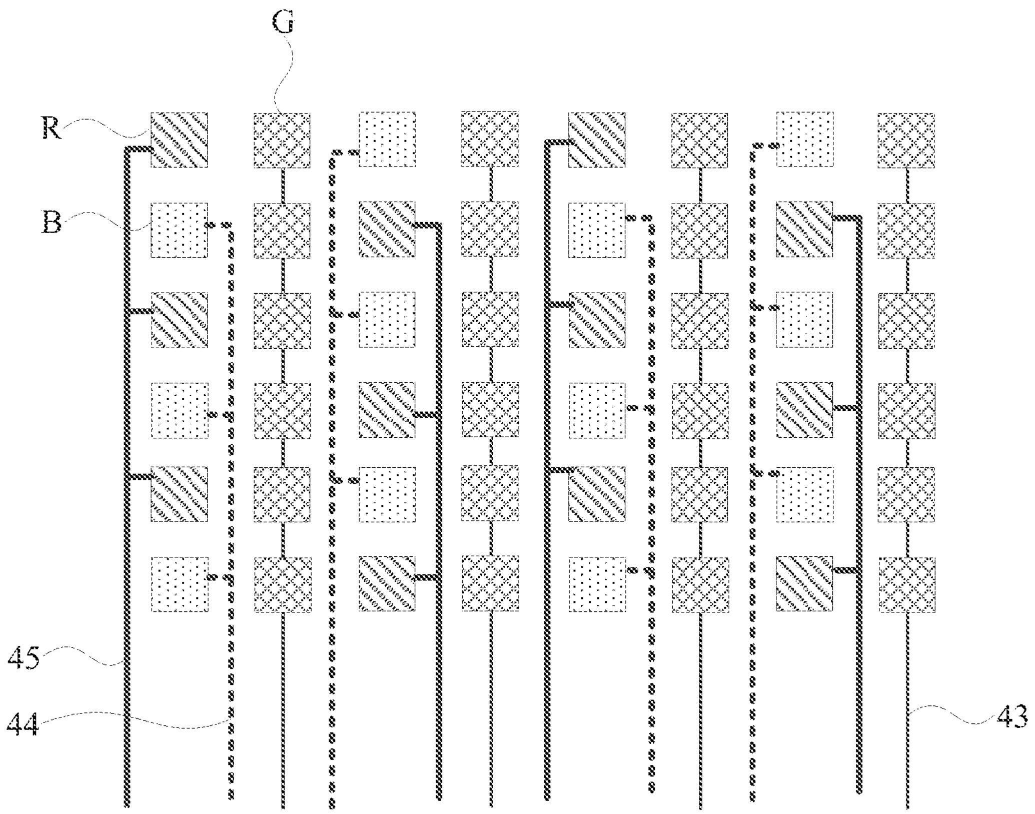
FIG. 5 is another schematic view showing the arrangement of the data lines in the display sub-circuitry according to one embodiment of the present disclosure.

As shown in FIG. 5, in some embodiments of the present disclosure, the plurality of sub-pixels includes sub-pixels arranged in a plurality of first columns and the sub-pixels arranged in a plurality of second columns. The sub-pixels in the first columns and the sub-pixels in the second columns are alternately arranged in a first direction, the sub-pixels in the first columns include first sub-pixels and second sub-pixels arranged alternately in a second direction, the sub-pixels in the second columns include a plurality of third sub-pixels arranged in the second direction, and the first sub-pixel, the second sub-pixel and the third sub-pixel are in different colors. The plurality of data lines includes a plurality of fourth data lines 44 and a plurality of fifth data lines 45, each fourth data line 44 is coupled to the first sub-pixels in the sub-pixels in a corresponding first column, and each fifth data line 45 is coupled to the second sub-pixels in the sub-pixels in the corresponding first column.

For example, the fourth data line 44 includes at least a portion extending in the second direction, and the fifth data line 45 includes at least a portion extending in the second direction.

For example, the fourth data line 44 is arranged at a same layer and made of a same material as the fifth data line 45.

According to the display device in the embodiments of the present disclosure, each fourth data line 44 is coupled to the first sub-pixels in the sub-pixels in a corresponding first column, and each fifth data line 45 is coupled to the second sub-pixels in the sub-pixels in the corresponding first column, so that the sub-pixels coupled to the fourth data line 44 are the first sub-pixels in a same color, and the sub-pixels coupled to the fifth data line 45 are the second sub-pixels in a same color.

When the data signals are transmitted to the sub-pixels through the fourth data lines 44 and the fifth data lines 45 and there is a small change in an image displayed by the display device, the data signals transmitted through the fourth data line 44 and the fifth data line 45 are maintained as constant voltages for a long time period, so as to reduce a change frequency of the data signals transmitted through the fourth data line 44 and the fifth data line 45. When an image displayed by the display device is refreshed, voltage values of the desired data signals for the first sub-pixels are similar to each other and voltage values of the desired data signals for the second sub-pixels are similar to each other, so swing amplitudes of the data signals transmitted through the fourth data lines 44 and the fifth data lines 45 are small, and there is a small change frequency of the data signals. In this regard, it is able to reduce the power consumption.

Based on the above-mentioned arrangement mode, although the quantity of data lines is increased, a load of each data line, the swing amplitude and the frequency of the data line are reduced, so it is still able to reduce the power consumption.

As shown in FIG. 4 and FIG. 5, in some embodiments of the present disclosure, the plurality of data lines further includes a plurality of third data lines 43, and each third data line 43 is coupled to the third sub-pixels in the sub-pixels in a corresponding second column.

For example, the third data line 43 includes at least a portion extending in the second direction.

As shown in FIG. 4, for example, when the display device includes the first data lines 41, the second data lines 42 and the third data lines 43, an orthogonal projection of the third data line 43 onto the base substrate at least partially overlaps with an orthogonal projection of the first data line 41 onto the base substrate, and at least partially overlaps with an orthogonal projection of the second data line 42 onto the base substrate. For example, the third data line 43 is arranged at a layer different from the first connection portion 411, and the third data line 43 is arranged at a layer different from the third connection portion 421. It should be appreciated that, the first connection portion 411, the third connection portion 421 and the third data line 43 may be arranged at different metal layers, and may be coupled to the structures at different layers through via-holes.

For example, the length of the first data line 41 and the length of the second data line 42 are greater than a length of the third data line 43.

For example, the third data line 43, the first connection portion 411 and the third connection portion 421 are arranged at different layers. For example, the display device includes three data line layers, the first connection portion 411 is arranged at a first data line layer, the third connection portion 421 is arranged at a second data line layer, and the third data line 43 is arranged at a third data line layer.

In a possible embodiment of the present disclosure, the first connection portion 411 and/or the third connection portion 421 do not overlap with the other sub-pixels. For example, the first connection portion 411 and/or the third connection portion 421 do not overlap with an anode of the green (G) pixel, so as to reduce a parasitic capacitance generated by the data line.

As shown in FIG. 5, when the display device includes the third data lines 43, the fourth data lines 44 and the fifth data lines 45, the third data line 43, the fourth data line 44 and the fifth data line 45 may be, but not limited to, arranged at a same layer and made of a same material.

Figure 6:
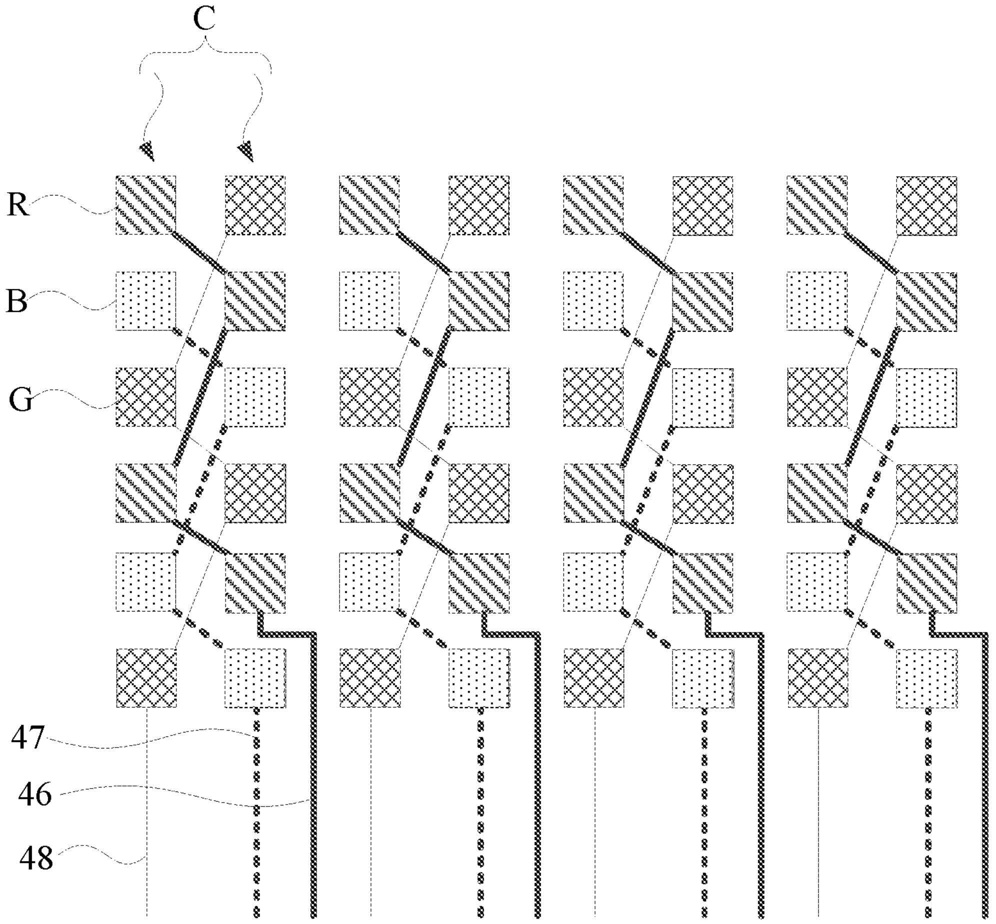
FIG. 6 is yet another schematic view showing the arrangement of the data lines in the display sub-circuitry according to one embodiment of the present disclosure.

As shown in FIG. 6, in some embodiments of the present disclosure, the plurality of sub-pixels includes sub-pixels arranged in a plurality of third columns, the sub-pixels in each third column include first sub-pixels, second sub-pixels and third sub-pixels arranged alternately, and the first sub-pixel, the second sub-pixel and the third sub-pixel are in different colors. The sub-pixels in the plurality of third columns include a plurality of sub-pixel groups C, and each sub-pixel group C includes sub-pixels in two adjacent third columns. The plurality of data lines includes a plurality of sixth data lines 46, a plurality of seventh data lines 47 and a plurality of eighth data lines 48, each sixth data line 46 is coupled to the first sub-pixels in a corresponding sub-pixel group, each seventh data line 47 is coupled to the second sub-pixels in the corresponding sub-pixel group, and each eighth data line 48 is coupled to the third sub-pixels in the corresponding sub-pixel group.

In some embodiments of the present disclosure, the plurality of sub-pixels includes sub-pixels arranged in a plurality of rows, and in an arrangement direction of the sub-pixels in each row; the sixth data line 46 is coupled to the first sub-pixels in each row in the corresponding sub-pixel group, the seventh data line 47 is coupled to the second sub-pixels in each row in the corresponding sub-pixel group, and the eighth data line 48 is coupled to the third sub-pixels in each row in the corresponding sub-pixel group.

According to the display device in the embodiments of the present disclosure, each sixth data line 46 is coupled to the first sub-pixels in the sub-pixels in a corresponding first column, each seventh data line 47 is coupled to the second sub-pixels in the sub-pixels in the corresponding first column, and each eighth data line 48 is coupled to the third sub-pixels in the corresponding sub-pixel group, so that the sub-pixels coupled to the sixth data line 46 are the first sub-pixels in a same color, the sub-pixels coupled to the seventh data line 47 are the second sub-pixels in a same color, and the sub-pixels coupled to the eighth data line 48 are the third sub-pixels in a same color.

When the data signals are transmitted to the sub-pixels through the sixth data line 46, the seventh data line 47 and the eighth data line 48 and there is a small change in an image displayed by the display device, the data signals transmitted through the sixth data line 46, the seventh data line 47 and the eighth data line 48 are maintained as constant voltages for a long time period, so as to reduce a change frequency of the data signals transmitted through the sixth data line 46, the seventh data line 47 and the eighth data line 48. When an image displayed by the display device is refreshed, voltage values of the desired data signals for the first sub-pixels are similar to each other, voltage values of the desired data signals for the second sub-pixels are similar to each other, and voltage values of the desired data signals for the third sub-pixels are similar to each other, so swing amplitudes of the data signals transmitted through the sixth data line 46, the seventh data line 47 and the eighth data line 48 are small, and there is a small change frequency of the data signals. In this regard, it is able to reduce the power consumption.

Based on the above-mentioned arrangement mode, although the quantity of data lines is increased, a load of each data line, the swing amplitude and the frequency of the data line are reduced, so it is still able to reduce the power consumption.

It should be appreciated that, the display device may be any product or member having a display function, such as a television, a display, a digital photo frame, a mobile phone or a tablet computer. The display device further includes a flexible circuit board, a printed circuit board and a back plate.

It should be appreciated that, in the embodiments of the present disclosure, the pixels may be arranged in, but not limited to, an RGBG arrangement mode. The above connection mode of the data lines is also applicable to conventional arrangement modes of the pixels such as delta and GGRB.

The present disclosure further provides in some embodiments a method for driving the above-mentioned display device, which includes: outputting a plurality of groups of first data signals, each group of first data signals corresponding to the sub-pixels in a same color: rearranging the plurality of groups of first data signals to obtain a plurality of groups of second data signals, each group of second data signals corresponding to the sub-pixels in at least one row, and at least two sub-pixels in the sub-pixels in the at least one row being in different colors: and transmitting each group of second data signals to a plurality of data lines.

As shown in FIG. 1 and FIG. 2, according to the method in the embodiments of the present disclosure, the control module 10 outputs the plurality of groups of first data signals, and each group of first data signals corresponds to the sub-pixels in a same color. The driving module 20 rearranges the plurality of groups of first data signals to obtain the plurality of groups of second data signals, each group of second data signals corresponds to the sub-pixels arranged in at least one row, and at least two sub-pixels in the sub-pixels in the at least one row are in different colors. The driving module 20 further transmits each group of second data signals to the plurality of data lines.

According to the method in the embodiments of the present disclosure, each group of first data signals corresponds to the sub-pixels in a same color, so the data signals in each group of first data signals are similar to each other, and a swing frequency and a swing amplitude of the data signal in each group of first data signals are greatly reduced. In this way, it is able to remarkably reduce the power consumption of the control module 10 when the control module 10 outputs each group of first data signals to the driving module 20, thereby to achieve a better power-saving effect.

The driving module 20 rearranges the plurality of groups of first data signals to obtain the plurality of groups of second data signals corresponding to the sub-pixels in each row. During the display, when the sub-pixels in each row are scanned, the driving module 20 writes the group of second data signals corresponding to the sub-pixels in each row into the sub-pixels in a corresponding row through the plurality of data lines, so as to achieve a normal display function of the display device.

Each data line is coupled to the plurality of sub-pixels in a same color, so it is able to remarkably reduce a change in a frequency and an amplitude of the second data signal transmitted through each data line, thereby to reduce the power consumption of the display device.

As shown in FIG. 1 and FIG. 2, in some embodiments of the present disclosure, the outputting the plurality of groups of first data signals includes: generating a to-be-displayed image: obtaining the plurality of groups of first data signals corresponding to the sub-pixels in different colors in accordance with the to-be-displayed image: and compressing and outputting the plurality of groups of first data signals.

For example, the graphic processing sub-module 101 generates the to-be-displayed image, the data separation sub-module 102 obtains the plurality of groups of first data signals corresponding to the sub-pixels in different colors in accordance with the to-be-displayed image, and the data compression sub-module 103 compresses and outputs the plurality of groups of first data signals.

According to the method in the embodiments of the present disclosure, the data separation sub-module 102 classifies the data signals corresponding to the to-be-displayed image, obtains the plurality of groups of first data signals corresponding to the sub-pixels in different colors, and transmits the plurality of groups of first data signals separately. Each group of first data signals corresponds to the sub-pixels in a same color, so the data signals in each group of first data signals are similar to each other, and a swing frequency and a swing amplitude of the data signal in each group of first data signals are greatly reduced. In this way, it is able to remarkably reduce the power consumption when each group of first data signals is outputted to the driving module 20, thereby to achieve a better power-saving effect. In addition, each group of first data signals corresponds to the sub-pixels in a same color, so the data signals in each group of first data signals are similar to each other. In this way, it is able to facilitate the compression of the plurality of groups of first data signals through the data compression sub-module 103.

As shown in FIG. 1 and FIG. 2, in some embodiments of the present disclosure, the rearranging the plurality of groups of first data signals to obtain the plurality of groups of second data signals includes decompressing the plurality of groups of first data signals after compression, and rearranging the plurality of groups of first data signals to obtain the plurality of groups of second data signals.

For example, the data decompression sub-module 201 decompresses the plurality of groups of first data signals after compression and transmits the decompressed first data signals to the data rearrangement sub-module 202, and the data rearrangement sub-module 202 rearranges the plurality of groups of first data signals to obtain the plurality of groups of second data signals corresponding to the sub-pixels in each row.

As shown in FIG. 1 and FIG. 2, in some embodiments of the present disclosure, the method further includes processing the plurality of groups of second data signals through a sub-pixel rendering algorithm and transmitting each group of second data signals processed through the sub-pixel rendering algorithm to the plurality of data lines.

According to the method in the embodiments of the present disclosure, the driving module 20 includes the data decompression sub-module 201, the data rearrangement sub-module 202 and the data processing sub-module 203, so as to transmit the plurality of first data signals to the plurality of data lines after compression, rearrangement and data processing.

The present disclosure further provides in some embodiments a display device, which includes a memory, a processor, and a computer program stored in the memory and executed by the processor. The computer program is executed by the processor so as to implement the above-mentioned method.

The computer program is executed by the processor, so as to: output the plurality of groups of first data signals, each group of first data signals corresponding to the sub-pixels in a same color: rearrange the plurality of groups of first data signals to obtain the plurality of groups of second data signals, each group of second data signals corresponding to the sub-pixels in at least one row, and at least two sub-pixels in the sub-pixels in the at least one row being in different colors: and transmit each group of second data signals to the plurality of data lines.

In the embodiments of the present disclosure, the computer program is executed by the processor, so as to: generate a to-be-displayed image: obtain the plurality of groups of first data signals corresponding to sub-pixels with different colors in accordance with the to-be-displayed image: and compress and output the plurality of groups of first data signals.

In the embodiments of the present disclosure, the computer program is executed by the processor, so as to: decompress the plurality of groups of first data signals after compression; and rearrange the plurality of groups of first data signals to obtain the plurality of groups of second data signals.

In the embodiments of the present disclosure, the computer program is executed by the processor, so as to process the plurality of groups of second data signals through a sub-pixel rendering algorithm and transmit each group of second data signals processed through the sub-pixel rendering algorithm to the plurality of data lines.

The implementation of the display device may refer to that of the method mentioned hereinabove with a same technical effect, which will thus not be particularly defined herein.

The present disclosure further provides in some embodiments a computer-readable storage medium storing therein a computer program. The computer program is executed by a processor so as to implement the above-mentioned method with a same technical effect, which will not be particularly defined herein. The computer-readable storage medium includes a read-only memory (ROM), a random access memory (RAM), a magnetic disk or an optical disk.

It should be appreciated that, when a signal line extends in a direction X, it means that the signal line includes a primary portion and a secondary potion coupled to the primary portion, the primary portion is a line, a segment or a strip-like portion and extends in the direction X, and a length of the primary portion in the direction X is greater than a length of the secondary portion in the other direction.

It should be further appreciated that, the expression "at a same layer" refers to that the film layers are arranged on a same structural layer. Alternatively, for example, the film layers on a same layer may be layer structures formed through forming thin layers for forming specific patterns through a single-film-forming process and then patterning the film layers with a same mask through a single patterning process. Depending on different specific patterns, a single patterning process may include multiple exposing, development or etching processes, and the specific patterns in the layer structure may be continuous or discontinuous. These specific patterns may also be arranged at different levels or have different thicknesses.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as “first” and “second” used in the specification and claims are merely used to differentiate different components rather than to represent any order, number or importance. Similarly, such words as “one” or “one of” are merely used to represent the existence of at least one member, rather than to limit the number thereof. Such words as “include” or “including” intends to indicate that an element or object before the word contains an element or object or equivalents thereof listed after the word, without excluding any other element or object. Such words as “connect/connected to” or “couple/coupled to” may include electrical connection, direct or indirect, rather than to be limited to physical or mechanical connection. Such words as “on”, “under”, “left” and “right” are merely used to represent relative position relationship, and when an absolute position of the object is changed, the relative position relationship will be changed too.

It should be appreciated that, in the case that such an element as layer, film, region or substrate is arranged “on” or “under” another element, it may be directly arranged “on” or “under” the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device, comprising:

a plurality of sub-pixels and a plurality of data lines, each data line being coupled to a plurality of sub-pixels in a same color;

a control module configured to output a plurality of groups of first data signals, each group of first data signals corresponding to the sub-pixels in a same color; and a driving module configured to receive the plurality of groups of first data signals corresponding to the sub-pixels in a same color output from the control module, and rearrange the plurality of groups of first data signals corresponding to the sub-pixels in a same color to obtain a plurality of groups of second data signals, each group of second data signals corresponding to the sub-pixels in at least one row, and at least two sub-pixels in the at least one row being in different colors, wherein the driving module is further configured to transmit each group of second data signals to the plurality of data lines.

2. The display device according to claim 1, wherein the control module comprises:

a graphic processing sub-module configured to generate a to-be-displayed image;

a data separation sub-module configured to obtain the plurality of groups of first data signals corresponding to the sub-pixels in different colors in accordance with the to-be-displayed image; and a data compression sub-module configured to compress and output the plurality of groups of first data signals.

3. The display device according to claim 2, wherein the driving module comprises:

a data decompression sub-module configured to decompress the plurality of groups of first data signals after compression; and a data rearrangement sub-module configured to rearrange the plurality of groups of first data signals to obtain the plurality of groups of second data signals.

4. The display device according to claim 3, wherein the driving module further comprises a data processing sub-module configured to process the plurality of groups of second data signals through a sub-pixel rendering algorithm and transmit each group of second data signals processed through the sub-pixel rendering algorithm to the plurality of data lines.

5. The display device according to claim 1, wherein the plurality of sub-pixels comprises sub-pixels arranged in a plurality of first columns and sub-pixels arranged in a plurality of second columns, the sub-pixels in the first columns and the sub-pixels in the second columns are alternately arranged in a first direction, the sub-pixels in the first column comprise first sub-pixels and second sub-pixels arranged alternately in a second direction, the sub-pixels in the second column comprise a plurality of third sub-pixels arranged in the second direction, and the first sub-pixel, the second sub-pixel and the third sub-pixel are in different colors, wherein the sub-pixels in the plurality of first columns comprise a plurality of sub-pixel groups, each sub-pixel group comprises sub-pixels in two adjacent first columns, the plurality of data lines comprises a plurality of first data lines, and each first data line is coupled to the first sub-pixels in a corresponding sub-pixel group.

6. The display device according to claim 5, wherein the plurality of sub-pixels comprises sub-pixels arranged in a plurality of rows, and in an arrangement direction of the sub-pixels in the plurality of rows, the first data line is coupled to the first sub-pixels in each row in the corresponding sub-pixel group.

7. The display device according to claim 6, wherein the first data line comprises a plurality of first connection portions and a second connection portion, the plurality of first connection portions is arranged in the arrangement direction of the sub-pixels in the plurality of rows, the first connection portions are coupled to the first sub-pixels in two adjacent rows in the corresponding sub-pixel group respectively, and the second connection portion is coupled to the first sub-pixel in a last row in the corresponding sub-pixel group.

8. The display device according to claim 7, wherein the plurality of data lines further comprises a plurality of second data lines, and each second data line is coupled to the second sub-pixels in a corresponding sub-pixel group.

9. The display device according to claim 8, wherein the second data line is coupled to the second sub-pixels in each row in the corresponding sub-pixel group.

10. The display device according to claim 9, wherein the second data line comprises a plurality of third connection portions and a fourth connection portion, the plurality of third connection portions is arranged in the arrangement direction of the sub-pixels in the plurality of rows, the third connection portions are coupled to the second sub-pixels in two adjacent rows in the corresponding sub-pixel group respectively, and the fourth connection portion is coupled to the second sub-pixel in a last row in the corresponding sub-pixel group.

11. The display device according to claim 1, wherein the plurality of sub-pixels comprises sub-pixels arranged in a plurality of first columns and sub-pixels arranged in a plurality of second columns, the sub-pixels in the first columns and the sub-pixels in the second columns are alternately arranged in a first direction, the sub-pixels in the first columns comprise first sub-pixels and second sub-pixels arranged alternately in a second direction, the sub-pixels in the second columns comprise a plurality of third sub-pixels arranged in the second direction, and the first sub-pixel, the second sub-pixel and the third sub-pixel are in different colors, wherein the plurality of data lines comprises a plurality of fourth data lines and a plurality of fifth data lines, each fourth data line is coupled to the first sub-pixels in the sub-pixels in a corresponding first column, and each fifth data line is coupled to the second sub-pixels in the sub-pixels in a corresponding first column.

12. The display device according to claim 5, wherein the plurality of data lines further comprises a plurality of third data lines, and each third data line is coupled to the third sub-pixels in the sub-pixels in a corresponding second column.

13. The display device according to claim 1, wherein the plurality of sub-pixels comprises sub-pixels arranged in a plurality of third columns, the sub-pixels in the third column comprise first sub-pixels, second sub-pixels and third sub-pixels arranged alternately, and the first sub-pixel, the second sub-pixel and the third sub-pixel are in different colors, wherein the sub-pixels in the plurality of third columns comprise a plurality of sub-pixel groups, each sub-pixel group comprises sub-pixels in two adjacent third columns, the plurality of data lines comprises a plurality of sixth data lines, a plurality of seventh data lines and a plurality of eighth data lines, each sixth data line is coupled to the first sub-pixels in a corresponding sub-pixel group, each seventh data line is coupled to the second sub-pixels in the corresponding sub-pixel group, and each eighth data line is coupled to the third sub-pixels in the corresponding sub-pixel group.

14. The display device according to claim 13, wherein the plurality of sub-pixels comprises sub-pixels arranged in a plurality of rows, wherein in an arrangement direction of the sub-pixels in the plurality of rows, the sixth data line is coupled to the first sub-pixels in each row in a corresponding sub-pixel group, the seventh data line is coupled to the second sub-pixels in each row in a corresponding sub-pixel group, and the eighth data line is coupled to the third sub-pixels in each row in a corresponding sub-pixel group.

15. A method for driving a display device, wherein the display device comprises:

a plurality of sub-pixels and a plurality of data lines, each data line being coupled to a plurality of sub-pixels in a same color;

wherein the method comprises:

outputting a plurality of groups of first data signals, each group of first data signals corresponding to the sub-pixels in a same color;

receiving the plurality of groups of first data signals corresponding to the sub-pixels in a same color output, and rearranging the plurality of groups of first data signals corresponding to the sub-pixels in a same color to obtain a plurality of groups of second data signals, each group of second data signals corresponding to the sub-pixels in at least one row, and at least two sub-pixels in the sub-pixels in the at least one row being in different colors; and transmitting each group of second data signals to the plurality of data lines.

16. The method according to claim 15, wherein the outputting the plurality of groups of first data signals comprises:

generating a to-be-displayed image;

obtaining the plurality of groups of first data signals corresponding to sub-pixels in different colors in accordance with the to-be-displayed image; and compressing and outputting the plurality of groups of first data signals.

17. The method according to claim 15, wherein the rearranging the plurality of groups of first data signals to obtain the plurality of groups of second data signals comprises:

decompressing the plurality of groups of first data signals after compression; and rearranging the plurality of groups of first data signals to obtain the plurality of groups of second data signals.

18. The method according to claim 17, further comprising processing the plurality of groups of second data signals through a sub-pixel rendering algorithm and transmitting each group of second data signals processed through the sub-pixel rendering algorithm to the plurality of data lines.

19. A display device, comprising a memory, a processor, and a computer program stored in the memory and executed by the processor, wherein the computer program is executed by the processor so as to implement the method according to claim 15.

20. A computer-readable storage medium storing therein a computer program, wherein the computer program is executed by a processor so as to implement the method according to claim 15.

* * * * *